(12) United States Patent
Piele

(10) Patent No.: US 10,011,322 B2
(45) Date of Patent: Jul. 3, 2018

(54) WHEEL HUB TRANSMISSION UNIT FOR A DRIVE WHEEL OF A VEHICLE, DRIVE WHEEL, AND VEHICLE HAVING AN AUXILIARY DRIVE

(71) Applicant: Theodor Piele, Gauting (DE)

(72) Inventor: Theodor Piele, Gauting (DE)

(73) Assignee: INNOTORQ GmbH, Martinsried (DE)

( * ) Notice: Subject to any disclaimer, the term of this patent is extended or adjusted under 35 U.S.C. 154(b) by 137 days.

(21) Appl. No.: 15/055,331

(22) Filed: Feb. 26, 2016

(65) Prior Publication Data

US 2016/0176475 A1    Jun. 23, 2016

Related U.S. Application Data

(63) Continuation of application No. PCT/EP2014/067617, filed on Aug. 19, 2014.

(30) Foreign Application Priority Data

Aug. 26, 2013 (EP) ..................... 13181730

(51) Int. Cl.
*B60B 27/02* (2006.01)
*F16D 41/24* (2006.01)
(Continued)

(52) U.S. Cl.
CPC ........... *B62M 6/60* (2013.01); *B60B 27/0026* (2013.01); *B60B 27/023* (2013.01);
(Continued)

(58) Field of Classification Search
CPC .... B60B 27/0026; B60B 35/121; B62M 6/50; B62M 6/60; G01L 3/104; B60Y 2200/13; F16D 41/12; F16D 41/24
See application file for complete search history.

(56) References Cited

U.S. PATENT DOCUMENTS 5,163,740 A    11/1992  Kawai et al.
6,523,659 B2    2/2003  Kanehisa et al.
(Continued)

FOREIGN PATENT DOCUMENTS

CN    1835851    9/2006
CN    102119324    7/2011
(Continued)

OTHER PUBLICATIONS

International Search Report dated Oct. 9, 2014 of international application PCT/EP2014/067617 on which this application is based, 2 pages.
(Continued)

*Primary Examiner* — Jacob S. Scott
*Assistant Examiner* — Lillian T Nguyen
(74) *Attorney, Agent, or Firm* — Ewers & Hasselmann PLLC

(57) ABSTRACT

A wheel hub transmission unit for a drive wheel of a vehicle is provided. The wheel hub transmission unit includes a wheel axle, a pinion hub carrier concentrically arranged with respect to the wheel axle, a pinion mounted in a torsionally rigid manner onto said pinion hub carrier and configured to drive the drive wheel, and a torque transmission device having a transmission sleeve. The transmission sleeve is made from a magnetically coded material and includes a measuring area that is utilized to measure a torque by utilizing magnetic properties of the magnetically coded material of the transmission sleeve. An annular space is radially provided between the transmission sleeve and the wheel axle in the measuring area with a sensor coil being accommodated therein, the annular space being axially accessible from outside the transmission sleeve.

17 Claims, 1 Drawing Sheet

(51) Int. Cl.
*B62M 6/50* (2010.01)
*B62M 6/60* (2010.01)
*B60B 27/00* (2006.01)
*B60B 35/12* (2006.01)
*F16D 41/12* (2006.01)
*G01L 3/10* (2006.01)

(52) U.S. Cl.
CPC ............ *B60B 35/121* (2013.01); *B62M 6/50* (2013.01); *F16D 41/12* (2013.01); *G01L 3/104* (2013.01); *B60B 2900/115* (2013.01); *B60Y 2200/13* (2013.01)

(56) References Cited

U.S. PATENT DOCUMENTS

| | | | |
|---|---|---|---|
| 6,866,604 | B2 | 3/2005 | Kamada et al. |
| 7,665,373 | B2 | 2/2010 | Sakers et al. |
| 9,063,024 | B2 | 6/2015 | Kitamura |
| 9,284,998 | B2 | 3/2016 | Gießibl |
| 2011/0120232 | A1 | 5/2011 | Lassanske |
| 2013/0049448 | A1* | 2/2013 | Kitamura ............ B60B 27/0068 301/110.5 |

FOREIGN PATENT DOCUMENTS

| | | |
|---|---|---|
| CN | 102963489 | 3/2013 |
| DE | 202011108018 U1 | 8/2012 |
| EP | 2689998 A1 | 1/2014 |
| JP | 54899827 U | 11/1973 |
| JP | S5386754 A | 7/1978 |
| JP | H08295998 A | 11/1996 |
| JP | 2002193178 A | 7/2002 |
| JP | 2002283410 A | 10/2002 |
| JP | 2004224335 A | 8/2004 |
| JP | 2011005936 A | 1/2011 |
| JP | 2012088185 A | 5/2012 |
| JP | 2012201134 A | 10/2012 |

OTHER PUBLICATIONS

Office Action issued in corresponding Chinese Patent Application No. 201480058463.1, dated Apr. 5, 2017; 7 pages.
Office Action issued in corresponding Chinese Patent Application No. 201480058463.1, dated Apr. 5, 2017 and English language translation thereof; 14 pages.

* cited by examiner

WHEEL HUB TRANSMISSION UNIT FOR A DRIVE WHEEL OF A VEHICLE, DRIVE WHEEL, AND VEHICLE HAVING AN AUXILIARY DRIVE

CROSS REFERENCE TO RELATED APPLICATIONS

This application is a continuation application of international patent application PCT/EP2014/067617, filed Aug. 19, 2014, designating the United States and claiming priority from European application 13181730.6, filed Aug. 26, 2013, and the entire content of both applications is incorporated herein by reference.

FIELD OF THE INVENTION

The invention relates to a wheel hub transmission unit for a drive wheel of a vehicle, to a drive wheel with the wheel hub transmission unit, and to a vehicle having an auxiliary drive with the drive wheel.

BACKGROUND OF THE INVENTION

Electrically driven vehicles are gaining more and more importance for meeting different individual mobility requirements. In particular, the electric bicycle is on the rise. An electric bicycle is a bicycle having an electric motor as an auxiliary drive. An electric drive assistance is conventionally requested by way of pedaling pedals which are fastened to the pedal cranks of the bicycle when the pedals are alternately pressed downward in a correspondingly pronounced manner. A chain ring is mounted on the pedal cranks in order to transmit a torque to the drive wheel of the bicycle, the drive wheel typically being the rear wheel, and the chain ring being coupled via a chain to a pinion which is mounted on the rear wheel in a torsionally rigid manner in the drive direction. The electric motor is conventionally accommodated in the hub of the rear wheel as a hub motor, the supply of which with electric power is brought about by rechargeable battery cells. The strength of the pedaling is detected by way of a torque measuring device, the electric power being called up from the rechargeable battery cells by way of a control device in a manner which corresponds to said torque measuring device, which electric power is fed to the hub motor for the auxiliary drive of the electric bicycle.

For the torque measuring device, it is known to use a measuring sleeve which is installed on the hub of the rear wheel. The measuring sleeve is made from non-magnetic material which is provided with a corresponding magnetization pattern which changes under the action of a torque on the measuring sleeve. This change in the magnetization pattern can be detected with the aid of an electrically operated coil pair, as a result of which a conclusion can be made about the magnitude of the torque. In order to tap off the magnetization pattern, the coil pair is arranged immediately adjacent to the measuring sleeve. Moreover, for sufficiently accurate measurement of the torque, the measuring sleeve is provided with a correspondingly long measuring section and the measuring sleeve is mounted in a radially and axially stable manner at its two longitudinal ends.

This results in the problem that the cabling of the coil pair is difficult and the measuring sleeve disadvantageously requires a large amount of installation space at the hub.

SUMMARY OF THE INVENTION

An object of the invention is to provide a wheel hub transmission unit for a drive wheel of a vehicle, a drive wheel with the wheel hub transmission unit, and a vehicle having an auxiliary drive with the drive wheel, the wheel hub transmission unit being of simple construction and space-saving.

The wheel hub transmission unit according to an aspect of the invention for the drive wheel of the vehicle has a wheel hub, a wheel hub carrier which is concentrically arranged with respect to the wheel hub and on which at least one pinion can be mounted in a torsionally rigid manner to drive the drive wheel, and a torque transmission device which is radially arranged between the pinion hub carrier and the wheel axle and which has a transmission sleeve which is concentrically arranged with respect to the wheel axle and which is produced from a magnetically coded material.

The transmission sleeve has a first longitudinal end, on which a drive coupling is provided, and via which the first longitudinal end and the pinion hub carrier are coupled to one another in a rotationally rigid manner, and a second longitudinal end which is arranged to face away from the first longitudinal end and at an axial spacing therefrom.

An output coupling arrangement is provided at a second longitudinal end, via which a torque can be transmitted to the drive wheel by the transmission sleeve, with the result that a measuring area of the transmission sleeve is configured axially between the couplings in order to measure the torque with the aid of the magnetic properties of the magnetically coded material of the transmission sleeve which change under the influence of the torque.

The transmission sleeve is mounted in a cantilever manner at its first longitudinal end in an axial extent region of the drive coupling arrangement on the wheel axle by way of a radial bearing and is supported at a radial spacing from the wheel axle, as a result of which an annular space for accommodating a sensor coil for tapping off the measuring area is radially provided between the transmission sleeve in the measuring area and the wheel axle.

The annular space is axially accessible at the second longitudinal end from outside the transmission sleeve. The drive wheel according to an aspect of the invention has a wheel hub, a wheel hub transmission unit and at least one of the pinions is mounted in a torsionally rigid manner on the pinion hub carrier.

The wheel hub is coupled by the output coupling arrangement to the pinions in order to transmit the torque from said pinion to said wheel hub. The vehicle according to an aspect of the invention having an auxiliary drive with the drive wheel has a drive assembly with a control device for a metered auxiliary driving, i.e., for a driving of the drive wheel in measured quantities, and a sensor coil which is accommodated in the annular space in order to tap off the measuring area of the transmission coil. The control device can be actuated by utilizing said sensor coil in such a way that the drive moment of the drive assembly is adapted to the torque to be transmitted by the wheel hub transmission unit.

As a result of the fact that the annular space is axially accessible from outside the transmission sleeve on account of the mounting of the transmission sleeve in a cantilever manner by way of the radial bearing, the cabling for the inner sensor coil at the second longitudinal end is advantageously to be guided to the outside of the transmission sleeve, and no additional passages for the cabling are needing to be provided in the wheel axle. The construction of the wheel hub transmission unit is therefore advantageously simple. Moreover, the transmission sleeve is advantageously of short configuration, although the measuring area is provided to be sufficiently long for the required measuring accuracy. The installation space of the wheel hub transmission unit is therefore advantageously small, with the result that the wheel hub transmission unit can be integrated easily into the drive wheel.

According to an aspect of the invention, the output coupling arrangement centers the second longitudinal end of the transmission sleeve about the wheel axle during the transmission of the torque. This advantageously achieves a situation where, although the transmission sleeve is mounted at the first longitudinal end in a cantilever manner by way of the radial bearing, the transmission sleeve nevertheless runs smoothly at the second longitudinal end in the case of corresponding mechanical loading during the transmission of the torque. The mechanical bending fatigue loading of the transmission sleeve during the transmission of the torque is therefore advantageously low. Moreover, corresponding non-round running of the transmission sleeve at the second longitudinal end would have the consequence of a falsification of the torque magnitude which is measured in the measuring area by way of the sensor coil. The centering action of the output coupling at the second longitudinal end counteracts this, with the result that the torque transmission device has a high measuring accuracy.

The output coupling arrangement according to an aspect of the invention is a freewheel. According to another aspect of the invention, the output coupling arrangement is a locking pawl freewheel with at least three locking pawls which are arranged at the same spacing over the circumference, or a roller freewheel with at least three rollers which are arranged at the same spacing over the circumference and are self-locking in the drive rotational direction. According to yet another aspect of the invention, the coupling arrangement is a toothed disk freewheel. The locking pawl freewheel with its at least three uniformly arranged locking pawls and the roller freewheel with its at least three uniformly arranged rollers result in self-centering about the wheel axle at the second longitudinal end. The toothed disk freewheel is of uniform construction over the circumference, with the result that the toothed disk freewheel has the self-centering effect. Centering about the wheel axle means that, during the transmission of the torque by the output coupling, the second longitudinal end of the transmission sleeve is held such that it is centered concentrically about the wheel axle, and a bending moment is almost not occurring on the transmission sleeve.

According to an aspect of the invention, the pinion hub carrier is preferably a sleeve which covers the measuring area of the transmission sleeve to the outside. As a result, the measuring area is protected to the outside by the transmission sleeve, and the measuring area is not subjected, for instance, to damaging environmental influences, such as dirt or jolts, for example. Moreover, the pinion hub carrier is given a length which is so large that a plurality of pinions can be satisfactorily accommodated on the pinion hub carrier so as to lie next to one another. Furthermore, according to another aspect of the invention, the outer side of the pinion hub carrier has a splined shaft profile which is formed by grooves and webs which run alternately parallel to the wheel axle. The pinion has a hub which is shaped correspondingly in a negative manner with respect to the splined shaft profile, with the result that the pinion can be mounted in a torsionally rigid manner on the pinion hub carrier in a positively locking manner in the circumferential direction.

The drive coupling arrangement preferably has an axial block which is coupled in an axially fixed manner to the wheel axle and against which the pinion hub carrier and/or the transmission sleeve bear/bears for axial fixing. According to another aspect of the invention, the axial block is a projection which radially protrudes to the inside from the pinion hub carrier, is fastened to the latter, and on which the transmission sleeve is axially supported. Furthermore, according to another aspect of the invention, the drive coupling arrangement has in each case one thread on the outer side of the first longitudinal end of the transmission sleeve and on the inner side of the pinion hub carrier, the threads engaging into one another and being threaded about the wheel axle, and the end face of the first longitudinal end of the transmission sleeve bearing against the axial block. The winding direction of the threads is preferably such that the transmission sleeve is driven toward the axial block in the axial direction during the transmission of the torque. As an alternative, it is preferred that the drive coupling has a locating fit between the outer side of the first longitudinal end of the transmission sleeve and the inner side of the pinion hub carrier, the end face of the first longitudinal end of the transmission sleeve bearing against the axial block.

According to an aspect of the invention, the drive coupling arrangement has an adhesive bond between the pinion hub carrier and the transmission sleeve.

A stable and compact overall design of the drive coupling arrangement is achieved by way of the abovementioned example embodiments of the drive coupling arrangement, the radial bearing being provided in the axial extent region of the drive coupling arrangement between the inner side of the transmission sleeve and the wheel axle. As a result of the alignment of the radial bearing with the threads or the locating fit, an optimum power flow is achieved during the transmission of the torque from the drive coupling to the output coupling. The torque is transmitted from the pinion to the pinion hub carrier via the threads or the locating fit and the end face and via the axial block to the transmission sleeve, the measuring area of the transmission sleeve protruding immediately axially from the radial bearing and the drive coupling arrangement. As a result, twisting of the measuring area is made possible during the transmission of the torque, without a bending moment which would impair the torque measurement being exerted on the transmission sleeve.

The axial block is preferably configured as one piece with the pinion hub carrier. As a result of the fact that the axial block radially protrudes to the inside on the pinion hub carrier and the threads are configured on the transmission sleeve and the pinion hub carrier, an assembly which is stable in the axial direction and radial direction between the pinion hub carrier and the transmission sleeve is achieved by the drive coupling arrangement and by way of the screw connection of the threads and the bearing of the end face of the first longitudinal end against the axial block. During the transmission of the torque from the pinion hub carrier via the drive coupling arrangement to the transmission sleeve, no disruptive warping and stress unevennesses, for instance, are transmitted from the drive coupling arrangement to the measuring area. Therefore, the measuring area can immediately adjoin the drive coupling arrangement, that is the radial bearing and the threads of the locating fit, as a result of which, for instance, transitions for attenuating stress peaks in the measuring area do not need to be provided. As a result, the overall length of the transmission sleeve can be kept low, although the measuring area is provided in its necessary axial length. Moreover, the measuring area can be guided as far as the output coupling arrangement, as a result of which any transitions for reducing warping and stress unevennesses between the output coupling arrangement and the measuring area do not need to be provided there either.

As a result of the provision of the output coupling arrangement, the pinion hub carrier and the transmission sleeve can be made in each case from materials which are suitable for them, preferably an aluminum alloy for the pinion hub carrier and high-strength non-magnetic steel for the transmission sleeve.

The vehicle having an auxiliary drive is preferably an electric bicycle.

BRIEF DESCRIPTION OF THE DRAWINGS

Example embodiments of the invention will now be described with reference to the drawings wherein.

DESCRIPTION OF THE PREFERRED EMBODIMENTS OF THE INVENTION

Figure 1:
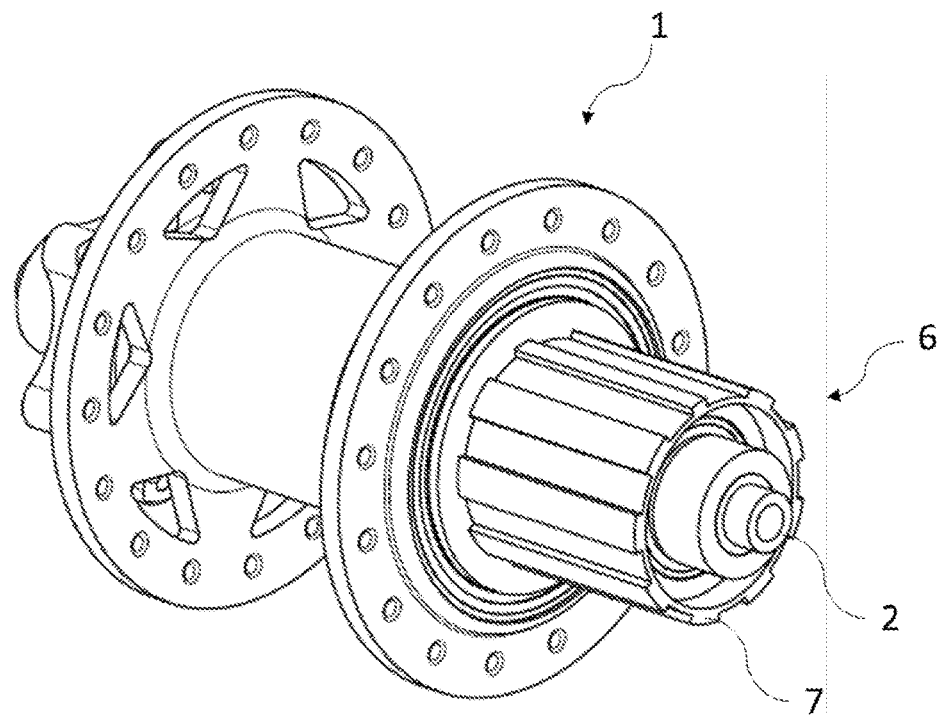
FIG. 1 shows a perspective illustration of a wheel hub according to an example embodiment.
Figure 2:
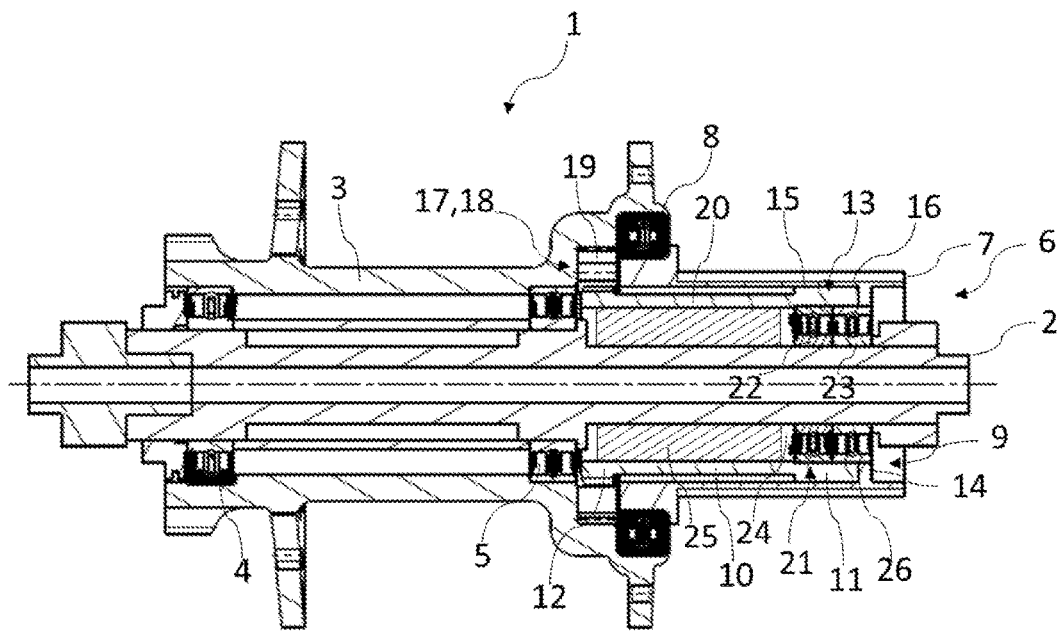
FIG. 2 shows an illustration of a longitudinal section of the wheel hub in FIG. 1 according to an example embodiment.

FIGS. 1 and 2 show a wheel hub 1 which has a wheel axle 2 and a hub body 3. The hub body 3 is mounted on the wheel axle 2 such that it can be concentrically rotated about the wheel axle 2 by a first wheel hub bearing 4 and a second wheel hub bearing 5.

The wheel axle 2 completely axially extends through the wheel hub body 3, the first wheel hub bearing 4 being arranged at the one longitudinal end of the wheel hub body 3 and the second wheel hub bearing 5 being arranged at the other longitudinal end of the wheel hub body 2. Two flat rings which are arranged at an axial spacing from one another are provided on the wheel hub body 3, into which flat rings spokes can be hooked.

Furthermore, the wheel hub 1 has a wheel hub transmission unit 6 which is laterally arranged about the wheel axle 2 next to the second wheel hub bearing 5 and on the other side of the first wheel hub bearing 4. The wheel hub transmission unit 6 has a pinion hub carrier 7 which is configured as a sleeve and has a splined shaft profile on its outer side for mounting at least one pinion on the pinion hub carrier 7. The pinion hub carrier 7 laterally protrudes from the hub body 3, the wheel axle 2 extending both through the hub body 3 and through the pinion hub carrier 7. On that side of the pinion hub carrier 7 which faces the wheel hub body 3, the pinion hub carrier 7 is radially mounted by a pinion hub carrier bearing 8 on the hub body 3, the pinion hub carrier bearing 8 bearing with its inner ring on the pinion hub carrier 7 and with its outer ring against the hub body 3.

The wheel hub transmission unit 6 has a torque transmission device 9 which has a transmission sleeve 10. The transmission sleeve 10 is arranged within the pinion hub carrier 7 and, like the pinion hub carrier 7, concentrically about the wheel axle 2. The transmission sleeve 10 has a first longitudinal end 11 and a second longitudinal end 12, the first longitudinal end 11 being arranged to face away from the hub body 3 and the second longitudinal end 12 being arranged to face the hub body 3. At the first longitudinal end 11, the transmission sleeve 10 is coupled to the pinion hub carrier 7 by a drive coupling arrangement 13. The drive coupling arrangement 13 has an axial block 14 which radially protrudes to the inside on the pinion hub carrier 7.

The axial block 14 is configured in one piece on the pinion hub carrier 7 and is arranged at that longitudinal end of the pinion hub carrier 7 which faces away from the hub body 3. Furthermore, the drive coupling arrangement 13 has an internal thread 15 which is arranged on the outer side of the first longitudinal end 11 of the transmission sleeve 10. In a manner which corresponds to the internal thread 15, the drive coupling arrangement 13 has an external thread 16 which is arranged on the inner side of the pinion hub carrier 7, the axial block 14 being arranged on that side of the pinion hub carrier 7 which faces away from the hub body 3. The transmission sleeve 10 is screwed by way of its external thread 16 to the internal thread 15 of the pinion hub carrier 7, the external thread 16 adjoining the end face 26 of the first longitudinal end 11 of the transmission sleeve 10, as a result of which the end face 26 bears against the axial block 14.

An output coupling arrangement 17 which is formed by a locking pawl freewheel 18 is arranged at the second longitudinal end 12 of the transmission sleeve 10. The locking pawl freewheel 18 has at least three locking pawls 19 which are uniformly distributed over the circumference, the locking pawl freewheel 18 acting with its locking pawls 19 in a centering action on the second longitudinal end 12 of the transmission sleeve 10 during the transmission of a torque.

The transmission sleeve 10 is produced from magnetically coded material, the area between the drive coupling arrangement 13 and the output coupling arrangement 17 being configured as a measuring area 20. A mounting arrangement 21 for the transmission sleeve 10 in a cantilever manner is provided in the axial region of the drive coupling arrangement 13, that is to say in the region of the axial extent of the threads 15, 16 and the axial block 14.

The mounting arrangement 21 is provided in a cantilever manner and is formed by a first deep groove ball bearing 22 and a second deep groove ball bearing 23 which are arranged on the wheel axle 2 so as to lie next to one another and to support the transmission sleeve 10 at the first longitudinal end 11 at a radial spacing from the wheel axle 2. Immediately next to the deep groove ball bearings 22, 23, the measuring area 20 extends as far as directly to the drive coupling arrangement 13. An annular space 24 is produced below the measuring area 20, in which annular space 24 a sensor coil 25 having two coils for tapping off the measuring area 20 is arranged. The cabling of the sensor coil 25 is laid at the second longitudinal end 12 of the transmission sleeve 10, since the transmission sleeve 10 is accessible from the outside here on account of the mounting arrangement 21 in the cantilever manner. The cabling is arranged between the wheel axle 2 and the transmission sleeve 10. Passages for the cabling in the transmission sleeve 10 or the wheel axle are not provided.

The torque which is oriented in accordance with a drive rotational direction acts on the pinion in order to drive the hub body 3. The locking pawl freewheel 18 is installed into the wheel hub 1 in such a way that the locking pawls 19 lock in the drive rotational direction. The torque is transmitted from the pinion via the splined shaft profile of the wheel hub carrier 7 to the latter. As a result of the screw connection of the threads 15, 16 and the bearing of the end face 26 against the axial block 14, the torque is transmitted from the wheel hub carrier 7 to the first longitudinal end 11 of the transmission sleeve 10. The radial support and mounting of the transmission sleeve 10 is achieved by the deep groove ball bearings 22, 23. The torque is transmitted to the hub body 3 at the second longitudinal end 12 of the transmission sleeve 10 by the locking pawl freewheel 18. The longitudinal ends 11, 12 are coupled in a torsionally rigid manner via the measuring area 20, as a result of which the measuring area 20 is twisted.

The magnetization pattern which is applied on the measuring area 20 changes in a manner which is dependent on the magnitude of the torsion. Said change is detected by the sensor coil 25. By way of the cabling of the sensor coil 25, the electric signals of the latter are guided to the outside of the wheel hub 1.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Wheel hub
2 Wheel axle
3 Hub body
4 First wheel hub bearing
5 Second wheel hub bearing
6 Wheel hub transmission unit
7 Pinion hub carrier
8 Pinion hub carrier bearing
9 Torque transmission device
10 Transmission sleeve
11 First longitudinal end
12 Second longitudinal end
13 Drive coupling arrangement
14 Axial block
15 Internal thread
16 External thread
17 Output coupling arrangement
18 Locking pawl freewheel
19 Locking pawl
20 Measuring area
21 Cantilever mounting
22 First deep groove ball bearing
23 Second deep groove ball bearing
24 Annular space
25 Sensor coil
26 End face

What is claimed is:

1. A wheel hub transmission unit for a drive wheel comprising:
   a wheel axle;
   a pinion hub carrier being concentrically arranged with respect to the wheel axle;
   at least one pinion being mounted in a torsionally rigid manner onto said pinion hub carrier and being configured to drive the drive wheel;
   a torque transmission device having a transmission sleeve and being radially arranged between the pinion hub carrier and the wheel axle;
   said transmission sleeve having a first longitudinal end and a second longitudinal end and being concentrically arranged with respect to the wheel axle;
   a drive coupling arrangement being provided on said first longitudinal end;
   said transmission sleeve being made from a magnetically coded material;
   said first longitudinal end and said pinion hub carrier being coupled via said drive coupling arrangement to one another in a rotationally rigid manner;
   said second longitudinal end being arranged to face away from the first longitudinal end;
   said second longitudinal end being arranged at an axial distance from said first longitudinal end;
   an output coupling arrangement being provided at said second longitudinal end via which a torque is transmitted from the transmission sleeve to the drive wheel;
   said transmission sleeve including a measuring area being axially provided between said drive coupling arrangement and said output coupling arrangement;
   said measuring area being utilized to measure the torque by utilizing magnetic properties of the magnetically coded material of the transmission sleeve which change under the influence of the torque;
   a radial bearing being configured to mount said transmission sleeve on the wheel axle in a cantilever manner at said first longitudinal end in an axial extended region of the drive coupling arrangement and to support said transmission sleeve at a radial distance from said wheel axle;
   an annular space being radially provided between the transmission sleeve and the wheel axle in said measuring area;
   a sensor coil being accommodated in said annular space and being configured to tap off the measuring area; and,
   said annular space being axially accessible at the second longitudinal end from outside the transmission sleeve.

2. The wheel hub transmission unit of claim 1, wherein the output coupling arrangement is centering the second longitudinal end of the transmission sleeve about the wheel axle during a transmission of the torque.

3. The wheel hub transmission unit of claim 2, wherein said output coupling arrangement is a freewheel.

4. The wheel hub transmission unit of claim 3, wherein said output coupling arrangement is a locking pawl freewheel having at least three locking pawls arranged at a same spacing over a circumference of the locking pawl freewheel.

5. The wheel hub transmission unit of claim 3, wherein said output coupling arrangement is a roller freewheel having at least three rollers arranged at a same spacing over a circumference of the roller freewheel, and
   wherein the at least three rollers are self-locking in a drive rotational direction.

6. The wheel hub transmission unit of claim 3, wherein said output coupling arrangement is a toothed disk freewheel.

7. The wheel hub transmission unit of claim 1, said pinion hub carrier being a sleeve which radially covers the measuring area of the transmission sleeve to the outside.

8. The wheel hub transmission unit of claim 1, said drive coupling arrangement having an axial block coupled in an axially fixed manner to the wheel axle; and,
   said pinion hub carrier bearing against said axial block and/or said transmission sleeve to axially fix the pinion hub carrier.

9. The wheel hub transmission unit of claim 8, said axial block being a projection which protrudes radially inward from the pinion hub carrier;
   said axial block being mounted on said pinion hub carrier; and,
   said transmission sleeve being axially supported by said axial block.

10. The wheel hub transmission unit of claim 9, further comprising an end face of the first longitudinal end of the transmission sleeve bearing against said axial block;
    said drive coupling having a first thread on the outer side of the first longitudinal end of the transmission sleeve and a second thread on the inner side of the pinion hub carrier; and,
    said first and second thread engaging into one another and being threaded about the wheel axle.

11. The wheel hub transmission unit of claim 10, wherein a winding direction of said first and second thread is configured such that said transmission sleeve is driven toward the axial block in an axial direction during a transmission of the torque.

12. The wheel hub transmission unit of claim 9, said drive coupling arrangement having a locating fit between an outer side of the first longitudinal end of the transmission sleeve and an inner side of the pinion hub carrier; and,
said end face of the first longitudinal end of the transmission sleeve bearing against said axial block.

13. The wheel hub transmission unit of claim 1, said drive coupling arrangement having an adhesive bond between the pinion hub carrier and the transmission sleeve.

14. The wheel hub transmission unit of claim 1, said pinion hub carrier being made from an aluminum alloy; and,
said transmission sleeve being made from a high-strength non-magnetic steel.

15. A drive wheel comprising:
a wheel hub;
the wheel hub transmission unit as claimed in claim 1; and,
said wheel hub being coupled by said output coupling arrangement to said at least one pinion to transmit torque from said pinion to said wheel hub.

16. A vehicle comprising:
an auxiliary drive with the drive wheel as claimed in claim 15;
a drive assembly having a control device configured to alternatively drive said drive wheel in measured quantities;
said sensor coil being accommodated in said annular space to tap off the measuring area of the transmission sleeve; and,
said control device being controlled by said sensor coil such that a drive moment of the drive assembly is adapted to the torque to be transmitted by the wheel hub transmission unit.

17. The vehicle of claim 16, wherein the vehicle is an electric bicycle.

* * * * *